United States Patent [19]

Skarupa

[11] Patent Number: 4,955,792
[45] Date of Patent: Sep. 11, 1990

[54] DRIVE FOR A LUBRICATION PUMP

[75] Inventor: Günter Skarupa, Pegnitz/Bavaria, Fed. Rep. of Germany

[73] Assignee: Baier & Koppel GmbH & Co, Präzisionsapparate, Pegnitz/Bavaria, Fed. Rep. of Germany

[21] Appl. No.: 345,781

[22] Filed: May 1, 1989

[30] Foreign Application Priority Data

May 5, 1988 [DE] Fed. Rep. of Germany ....... 3815233

[51] Int. Cl.$^5$ .............................................. F04B 17/04
[52] U.S. Cl. ...................................... 417/399; 184/29
[58] Field of Search ................ 417/398, 399, 490; 184/29, 27.2, 36, 39.1

[56] References Cited

U.S. PATENT DOCUMENTS

| 1,845,429 | 2/1932 | Lorenz et al. | 184/27.2 |
| 1,980,984 | 11/1934 | Davis | 184/27.2 |
| 2,063,352 | 12/1936 | Stewart | 184/29 |
| 2,521,177 | 9/1950 | LeClair | 184/7 |
| 3,561,565 | 2/1971 | Woor | 184/4 |
| 3,985,205 | 10/1976 | Hedlund et al. | 184/1 |
| 4,147,233 | 4/1979 | Smith | 184/29 |
| 4,324,316 | 4/1982 | Thrasher et al. | 184/29 |

FOREIGN PATENT DOCUMENTS

| 816176 | 10/1951 | Fed. Rep. of Germany. |
| 1105383 | 3/1968 | United Kingdom. |
| 2155417 | 9/1985 | United Kingdom. |

Primary Examiner—Stephen M. Hepperle
Attorney, Agent, or Firm—Toren, McGeady & Associates

[57] ABSTRACT

A drive for a lubrication pump for a centralized lubrication system of utility vehicles, including trailers, semi-trailers, special vehicles and the like. The lubrication pump is used for lubricants which are difficult to press and have a high penetration. The lubrication pump includes an agitator mounted in a lubricant container and an eccentrically driven delivery piston transporting the lubricant. The agitator and the eccentric member are mounted on a common drive shaft. The drive for the lubrication pump is a pneumatic drive and is controlled by an explosion-protected magnetic valve.

14 Claims, 3 Drawing Sheets

DRIVE FOR A LUBRICATION PUMP

BACKGROUND OF THE INVENTION

1. Field of the Invention

The present invention relates to a drive for a lubrication pump for a centralized lubrication of utility vehicles, including trailers, semi-trailers, special vehicles and the like. The lubrication pump is used with lubricants which are preferably difficult to press and have a high penetration. The lubrication pump includes an agitator mounted in a lubricant container and an eccentrically driven delivery piston for the lubricant transport. The agitator and an eccentric or cam member are mounted on a common drive shaft.

2. Description of the Related Art

The preferred field of application of the present invention, i.e., a lubrication with greases which are difficult to press, concerns specifically a lubrication with greases of the class NLGI 2. These greases have a high penetration; accordingly, they require a substantial pressing force.

In the past, in a lubrication system of the above-described type, an electric motor was used as a drive. This drive acts on the common drive shaft through a step-down gear unit. The use of an electric motor has the disadvantage that because of the load-dependent variations in the rate of rotation of such an electric motor, the rate of rotation of the drive shaft drops significantly with increasing load while the rate of rotation increases with a decrease of the load.

Since the vehicles mentioned above are subjected to very different temperatures from severe frost to great heat, and since the penetration of the grease is substantially dependent upon the temperature, very different rates of rotation of the drive shaft and, thus, the delivery of different quantities of lubricant occur depending upon the prevailing temperature.

Lubrication systems used in the past have the additional disadvantage that the use of electric motors is not permitted in utility vehicles which transport dangerous material of the class A 1(GGVS UL.3/3b). While the use of explosion-protected electric motor would be theoretically possible in this danger class, this use is not possible for practical reasons because of the high manufacturing costs of such explosion-protected motors.

It is, therefore, the primary object of the present invention to provide a drive for a lubrication pump of the above-described type which can be used without additional expenses in the manufacture of utility vehicles for the dangerous material class A 1(GGVS UL.3/3b) in which the delivery rate of the lubricant is to be essentially independent of the load.

SUMMARY OF THE INVENTION

In accordance with the present invention, a pneumatic drive is used for the lubrication pump and this drive is controlled by means of an explosion-protected magnetic valve.

A pneumatic drive and an explosion-protected magnetic valve meet the requirements of dangerous material class A 1(GGVS UL.3/3b). In addition, a pneumatic drive with an explosion-protected magnetic valve can be manufactured substantially less expensively than an explosion-protected electric motor and the controls therefor. Moreover, a magnetic drive is more robust in its construction than an electric motor. The speed of operation of the pneumatic drive is essentially independent of the load to be delivered. This means that an essentially constant speed of operation of the lubricant supply system occurs even when greases are used which are difficult to press and when different ambient temperatures occur.

It should further be mentioned that different lubrication systems with pneumatic drives were used in the past in which compressed air is admitted to one side of a follower piston while the lubricant was placed on the other side of the piston. The lubricant was forced by the piston toward the delivery pistons by means of the air pressure. This system has disadvantageous leakages of air into the lubricant reservoir as well as of lubricant into the air space. Also, the conveyance of lubricant was problematic. Accordingly, the systems used in the past were unsatisfactory and unsafe. Also, the inclusions of air caused the lubricant to foam.

In accordance with a preferred feature of the present invention, the control of the magnetic valve is carried out in dependence upon the number of times the brake lights of the vehicle are actuated or by an electronic control unit. As a result, too little lubrication or an excess lubrication are avoided and the quantities of lubricant required by the vehicle are supplied rather accurately to the points where lubrication is required.

In accordance with another preferred feature of the present invention, the pneumatic drive effects a rotation of the drive shaft of the agitator and of the eccentric member which is at least slightly greater than a complete rotation of the drive shaft, for example, by 1.2 of a complete shaft rotation. This feature ensures that a working path or stroke of the pneumatic drive turns the common drive shaft of agitator and eccentric member to such an extent that no problems occur in the case of an undesired backward rotation of the eccentric member and, thus, of the drive shaft which may happen when the eccentric member is in a certain position.

Additional features of the present invention provide advantageous and robust embodiments of the pneumatic drive in the form of a drive piston within a guide chamber and the related structural elements. Additional preferred features relate to the supply of air.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
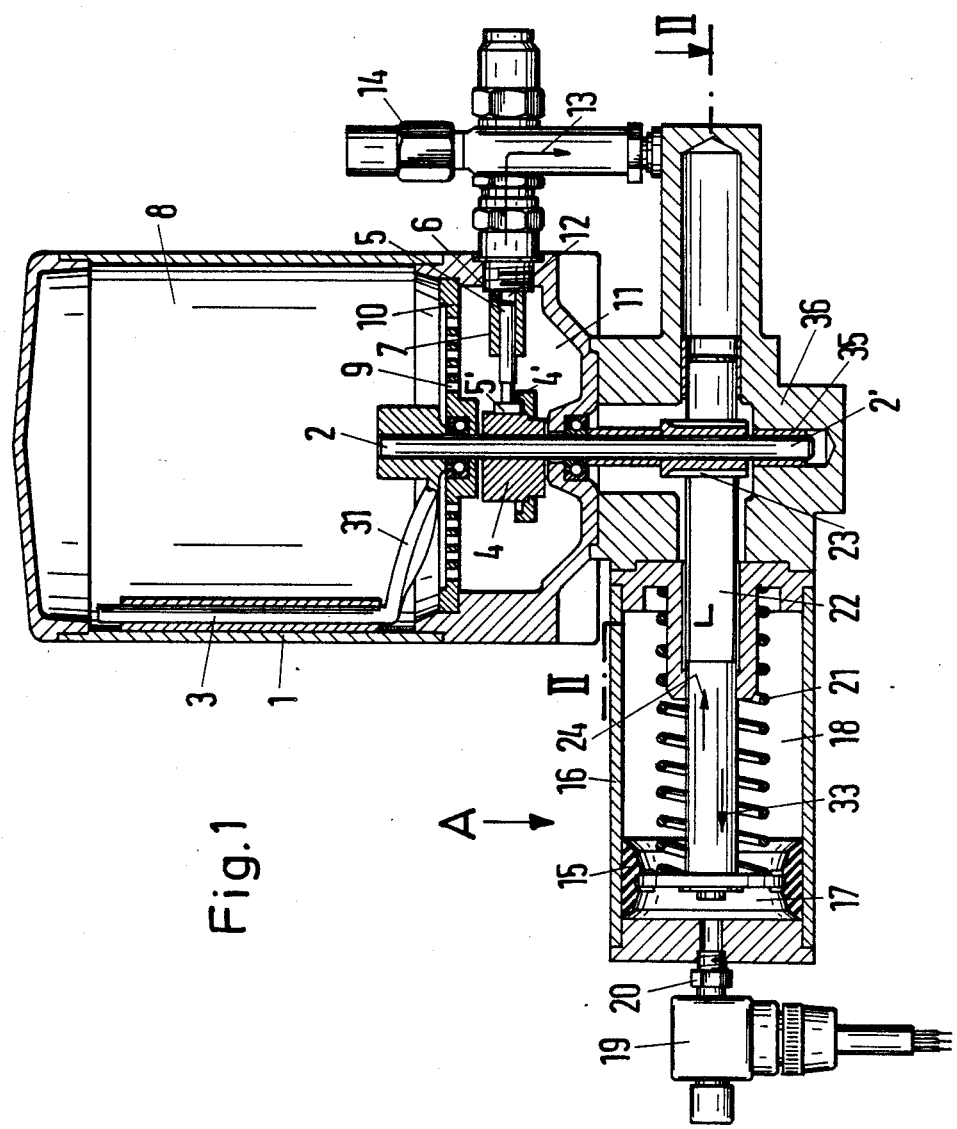
FIG. 1 is a schematic sectional view of a lubrication system according to the present invention including pump, pneumatic drive, air supply and lubricant discharge.

With the aid of FIG. 1 of the drawing, the known construction of a lubrication pump shall be explained first. An upper portion of a drive shaft 2 extends into a lubricant housing 1. An agitator 3 revolving together with the drive shaft 2 and an eccentric or cam member 4 which also revolves with the drive shaft 2 are mounted on drive shaft 2.

FIG. 1 shows a position of the eccentric member 4 in which its portion with the greater radius is to the left of shaft 2 while its portion with the smaller radius is in a position to the right of shaft 2. Thus, FIG. 1 shows a piston 5 for delivering the lubricant in its most retracted position in which lubricant can be conveyed into a receiving space 12 of a pump element 7 through an opening or suction bore 6 of the pump element 7.

The lubricant is in the interior 8 of the housing 1 where it is stirred by the agitator arm 3. Pressure resulting from the obliquely shaped agitator bottom 31 forces the lubricant through openings 9 of a bottom wall 10 of the interior 8 and into another reservoir 11 which surrounds the eccentric member 4 and the pump element 7. The lubricant is under a certain excess pressure in this reservoir 11. Together with a negative pressure in the receiving space 12 of the pump element 7, the excess pressure in reservoir 11 is sufficient in this position of the conveying piston 5 to fill the receiving space 12 with lubricant. Any air inclusions in the lubricant have previously been removed or rendered harmless by pressing the lubricant through the openings 9.

When the drive shaft 2 is rotated by the pneumatic drive in a manner to be described below, the eccentric member 4 pushes the piston 5 toward the right and the lubricant is delivered to a distribution system and the lubrication points as indicated by arrow 13. A pressure release valve or safety valve is indicated by reference numeral 14. When the shaft 2 is rotated further, the eccentric member is returned again into the position illustrated in FIG. 1. In accordance with a preferred feature, the shaft 2 is rotated beyond the position shown in FIG. 1. When the delivery or conveying piston 5 is moved in this manner by the eccentric member 4 as a result of a working stroke of the pneumatic system, it is recommended that the shaft 2 carries out more than a complete rotation, for example, 1.2 times of a complete rotation. When the piston 5 forces the lubricant in the direction of arrow 13, the piston closes the opening or transverse bore 6, so that no lubricant can be conveyed into the space 12 during this phase. As soon as the opening 6 is released as shown in FIG. 1, more lubricant is forced into the space 12.

The pneumatic drive mentioned above is located underneath the lubricant container and the pump components. The drive includes a drive piston 15 which is slidingly mounted in a cylindrical guide sleeve 16. The piston 15 divides the sleeve 16 into a first chamber 17 to the left as shown in FIG. 1 and a second chamber 18 to the right as shown in FIG. 1. Compressed air of the drive is supplied through line 20 to the first chamber 17 from an explosion-protected magnetic or solenoid valve 19. The valve preferably is a so-called 3/2-way magnetic or solenoid valve. The movement of the drive piston 15 toward the right is against the force of a spring 21.

A rack 22 which extends into the second chamber 18 is fastened to the drive piston 15. Rack 22 meshes with a gear wheel or pinion 23 which is mounted through a freewheel at the lower portion of the drive shaft 2. During a working stroke of the drive piston in the direction of arrow 24, the freewheel blocks and the drive shaft 2 is rotated. The force of the pressure presses the return spring together. The length of the toothing 22' of the rack 22 is dimensioned in such a way that with one working stroke the piston 5 is moved once toward the right and then back at least into the initial position of FIG. 1 by means of a driver 4' of the eccentric member 4 which acts on a collar 5' of the piston 5.

Figure 2:
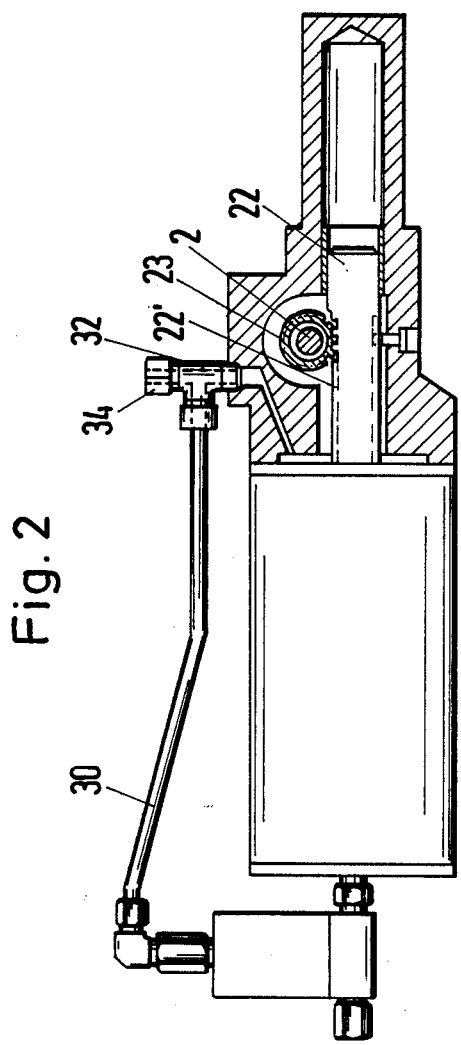
FIG. 2 is a top view in the direction of arrow A of FIG. 1 and a sectional view along sectional line II—II of FIG. 1.

After the working stroke has been concluded, the magnetic valve or 3/2-way valve 19 interrupts the supply of compressed air to the first chamber 17. The magnetic valve 19 is then switches as shown in FIG. 2. so that the supply of compressed air is blocked and the air in the chamber 17 is released through the magnetic valve 19 to an air return line 30. Any air still in the first chamber 17 is conducted through this line 30 and a screw connection 32 of the second chamber 18. At this stage, the second chamber 11 is relatively small and the volume of the first chamber 17 is relatively large. The air is conducted to the second chamber 18 because the return spring 21 forces the drive piston 15 in the direction of the return stroke or non-working stroke indicated by arrow 33.

Any air in the second chamber 18 during the working stroke is conducted through the pipe piece 34 of the screw connection 32 to the outside. Because of the above-described return of air into the second chamber 18 and because the exhaust air in the first chamber 17 has a higher pressure than atmospheric pressure, moisture or dirt is prevented from entering the second chamber through the screw connection 32, 34 during the return stroke 3.

During the return stroke 33, the freewheel between the pinion 23 and the drive shaft 2 ensures that the shaft is not rotated. It may be a conventional freewheel, for example, a sleeve-type freewheel. Moreover, another freewheel 35 is provided between the lower end 2' of the drive shaft 2 as shown in FIG. 1 and a bearing housing 36. This freewheel 35 permits a rotation of the shaft 2 only in the intended drive direction and, thus, prevents an undesired return rotation of the eccentric member 4 and the agitator 3 caused by restoring moments.

The magnetic valve is controlled in a manner not illustrated in detail preferably in dependence upon the number of times the brake lights of the utility vehicle are actuated or by an electronic control unit. Utility vehicles are not only vehicles having their own drive, but also trailers or semi-trailers and special vehicles.

Figure 3:
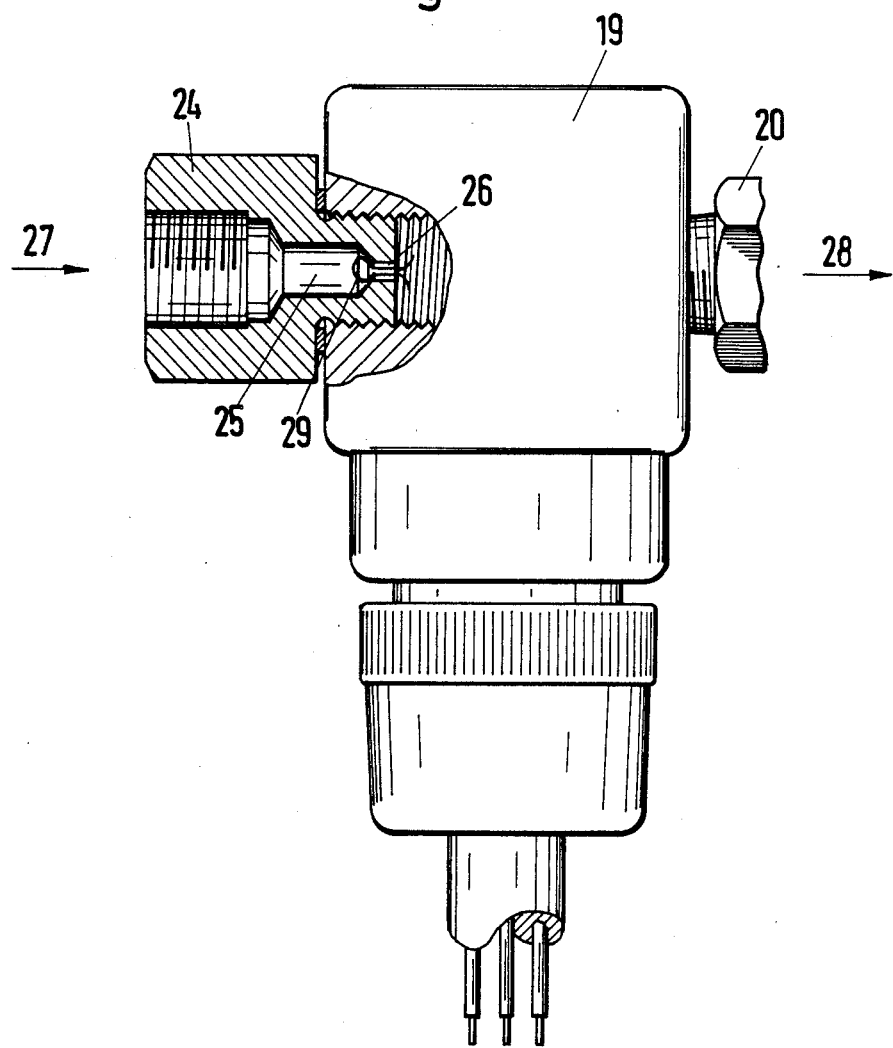
FIG. 3 is a partially sectional view, on a larger scale, of the magnetic valve with air supply.

It is recommended to provide for the air supply a throttle point, for example, at the inlet 24 of the magnetic valve. As indicated by reference numeral 25 in FIG. 3, the throttle point reduces the cross-sectional area available for the air. Another even narrower throttle point in the form of a nozzle 26 is provided in the air path. This provides the advantage that, when the magnetic valve 19 is opened, the air passage indicated by arrows 27, 28 does not reach the first chamber 17 suddenly or explosion-like, which would result in a disadvantageously strong impulse on the drive piston 15 at the beginning of the working stroke. The throttle points 25, 26 ensure that the air pressure is built up in the first chamber 17 with a certain time delay and, thus, the agitator 3 can be rotated against the resistance of the lubricant in the container 1. In order to prevent icing or clogging with dirt of the nozzle 26, a pin 29 may be placed in the nozzle, wherein the outer diameter of the pin is smaller than the inner diameter of the nozzle. The air flow causes the pin to be moved back and forth within the nozzle 26 and, thus, prevents icings or dirt deposits.

While a specific embodiment of the invention has been shown and described in detail to illustrate the application of the inventive principles, it will be understood that the invention may be embodied otherwise without departing from such principles.

I claim:

1. In a drive for a lubrication pump for a centralized lubrication system of utility vehicles, including trailers, semi-trailers, special vehicles and the like, the lubrication pump being used for lubricants which are difficult to press and have a high penetration, the lubrication pump including an agitator mounted in a lubricant container, a delivery piston for transporting the lubricant, and an eccentric member for driving the delivery piston, the agitator and the eccentric member being mounted on a common drive shaft, the improvement comprising the drive for the lubrication pump being a pneumatic drive, the drive further comprising an explosion-protected magnetic valve for controlling the drive.

2. The drive according to claim 1, comprising means for controlling the magnetic valve in dependence upon the number of times a brake light of the vehicle is actuated.

3. The drive according to claim 1, wherein the pneumatic drive includes means for effecting the rotation of the drive shaft of the agitator and of the eccentric member which is at least slightly greater than a complete rotation of the drive shaft.

4. The drive according to claim 3, wherein the rotation of the drive shaft is 1.2 times a complete rotation of the drive shaft.

5. The drive according to claim 1, further comprising a pneumatically operated drive piston, a rack mounted on the drive piston so that the drive piston moves the rack, a pinion mounted on the drive shaft for the agitator and the eccentric member, the rack and the pinion being mounted so as to mesh with each other.

6. The drive according to claim 5, wherein the rack has a length and the rack and pinion have a step-down ratio which are selected such that a working stroke of the drive piston effects at least slightly more than a complete rotation of the drive shaft.

7. The drive according to claim 6, wherein a working stroke of the drive piston effects 1.2 times a complete rotation of the drive shaft.

8. The drive according to claim 5, comprising a return spring for effecting a return stroke of the drive piston in the opposite direction of the working stroke, and a freewheel provided between the rack and the pinion.

9. The drive according to claim 8, comprising a housing for the pneumatic drive, and another freewheel provided between the drive shaft and the housing, the another freewheel permitting a rotation of the drive shaft in drive direction and blocking the drive shaft in the other direction of rotation.

10. The drive according to claim 9, comprising a guide sleeve in which the drive piston is slidingly mounted, the drive piston dividing the guide sleeve into a first and a second chamber, means for admitting compressed air to the first chamber, wherein at least a portion of the rack and a return spring are mounted in the second chamber.

11. The drive according to claim 10, comprising an exhaust air return line extending from the first chamber into the second chamber through the magnetic valve, a connecting means to the ambient air at a connection of the exhaust air return line to the second chamber, and a control means of the magnetic valve for interrupting the admission of compressed air after the working stroke has been concluded and for returning the exhaust air.

12. The drive according to claim 11, wherein the exhaust air return line is in communication with the connecting means of the second chamber with the ambient air.

13. The drive according to claim 10, wherein the means for admitting compressed air includes a throttle for effecting the building-up of air pressure in the first chamber with a certain time delay after the magnetic valve has been opened.

14. The drive according to claim 13, wherein the throttle includes a throttle nozzle, a splint having a smaller diameter than the nozzle being inserted in the nozzle.

* * * * *